The United States Patent

Huber

[11] Patent Number: 4,755,890
[45] Date of Patent: Jul. 5, 1988

[54] CHANNEL FILTER
[75] Inventor: Don Huber, San Jose, Calif.
[73] Assignee: Maxtor, San Jose, Calif.
[21] Appl. No.: 10,348
[22] Filed: Feb. 3, 1987
[51] Int. Cl.[4] .............................................. G11B 5/09
[52] U.S. Cl. ...................................................... 360/45
[58] Field of Search ............................ 360/45, 46, 65; 333/28 R; 375/58, 60

[56] References Cited
U.S. PATENT DOCUMENTS
4,264,935  4/1981  Lee ........................................ 360/45

Primary Examiner—Vincent P. Canney
Attorney, Agent, or Firm—Blakely, Sokoloff Taylor & Zafman

[57] ABSTRACT

A channel filter employing time domain targeting techniques to eliminate inter symbol interference in the reading of information from magnetic media. A pulse detector outputs a signal characteristic of polarity reversals on the surface of magnetic storage media. This output signal is coupled to a tapped delay line network and a moderate order L-C network. The tapped delay line provides an output signal to the L-C network, which flattens out pre-cursive and post-cursive undershoots. As a result, a moderate order L-C network is sufficient to approximate the desired target response so that maximum information density can be achieved. The tapped delay line provides an output signal that consists of a superposition (sum) of the input signal delayed and weighted. This forms a transversal filter. As with any linear filter, reciprocity applies. Consequently, the output of the tapped delay line is taken from the input with AC coupling directly to ground. The output is taken from a low characteristic impedence, eliminating the need for an internal amplifier capable of driving a low impedance equal to the characteristic impedance of the delay line.

7 Claims, 3 Drawing Sheets

CHANNEL FILTER

BACKGROUND OF THE INVENTION

1. Field of the Invention

This invention relates to the field of channel filters for use in detecting and decoding read signals from mass storage media.

2. Background Art

In present day data processing systems, it is desired to provide a large amount of memory which can be accessed in a minimum amount of time. One type of memory which has enjoyed widespread use in the data processing field is that of magnetic media disk memories.

In general, disk memories are characterized by the use of one or more magnetic media disks stacked on a spindle assembly and rotating at a high rate of speed. Each disk is divided into a plurality of concentric "tracks" with each track being an addressable area of the memory array. The individual tracks are accessed through magnetic "heads" which fly over the disks on a thin layer of air. Typically, the disks are two sided with a head accessing each side.

The heads are in substantial alignment and are mounted to an actuator motor which moves the heads from track to track during the reading and writing of information from the disks. The actuator motor may be a "voice coil" electrodynamic motor which has a coil moving within a permanent magnetic field, defining a cylindrical core. Alternatively, the motor may have a "rotary" type coil, such as is described in U.S. patent application Ser. No. 444,465 filed on Nov. 24, 1982, and 893,955 filed on Aug. 7, 1986, both assigned to the assignee of the present invention.

Information is encoded on magnetic media disks as a series of binary "bits" indicating a "1" or a "0". These bits are encoded as the presence or absence of a magnetic flux reversal. The capacity of a storage disk is thus dependent on the number of flux reversals which can be accurately written onto and read from a magnetic media storage disk.

In present day technology, the magnetic flux reversals are written onto, and read from, the magnetic media through the use of thin film heads. The heads have two thin pole faces which permit the application of flux reversals to the magnetic media. Currently, the widths of these pole faces are limited by deposition technology, resulting in time and economic limits on the width of the pole faces.

The finite pole tip width of present day thin film heads result in pre-cursive and post-cursive undershoots on the output signals (flux reversals) during the reading of information stored on a magnetic media disk. Pre-cursive and post-cursive undershoot can be limited or eliminated by utilizing wider pole faces on the magnetic head. However, as previously mentioned, present day manufacturing capabilities place severe time and economic limits on the width of the pole tips. For example, widening the pole faces requires additional deposition time.

The pre-cursive and post-cursive undershoots result in a widening of the "time window" which defines a "bit". Further barrowing of the pole faces of the magnetic head could be utilized to narrow the window of each pulse, resulting in the potential for greater density, but such a configuration results in a deepening of the pre-cursive and post-cursive undershoots. Further, if the pole faces of a magnetic head are too narrow, it is very difficult to maintain required accuracy in the manufacture of thin film head throat height. The result is that it is difficult to generate a magnetic field strong enough to erase data already written onto a magnetic media disk.

Still, it is desired to narrow the time window of signals read by the magnetic head so that more signals may be read in a given time and correspondingly greater information density may be achieved. One prior art attempt to narrow the time window associated with semi-infinite pole tips is known as a minimum bias windowing technique and is described in U.S. Pat. No. 4,344,093 issued Aug. 10, 1982 and assigned to the Sperry Corporation. In minimum bias windowing, read pulses are narrowed so that they do not overlap and thus do not cause peak shift or amplitude variation of the read signal. Pulse narrowing results in an increase in the bandwidth of the read pulses, requiring a corresponding increase in the read system bandwidth with an accompanying increase in noise. The prior art utilizes an equalizer circuit coupled to the read circuit to produce a symmetrical signal with a limited degradation of signal to noise ratio.

Although this film heads exhibit peaked, wide bandwidth frequency response plots, the use of conventional polynomial frequency response low pass filters results in large amounts of peak shift due to inter-symbol interference in connection with pre-cursive and post-cursive undershoots. These peak shifts cause significant reduction in the achievable window margin in magnetic media storage systems.

Therefore, it is an object of the present invention to provide a channel filter which substantially elminates the excessive inter-symbol interference characteristic of thin film heads in reading polarity reversals from magnetic media storage systems.

It is another object of the present invention to provide a channel filter in which a moderate order L-C filter may be utilized.

It is yet another object of the present invention to provide a channel filter resulting in improved recording preformance in terms of horizontal and vertical margins.

SUMMARY OF THE PRESENT INVENTION

A channel filter employing time domain targeting techniques to eliminate inter-symbol interference in the reading of information from magnetic media. A pulse detector outputs a signal characteristic of polarity reversals on the surface of magnetic storage media. This output signal is coupled to a tapped delay line in tandem with a moderate order L-C network. The tapped delay line provides an output signal to the L-C network, which flattens out pre-cursive and post-cursive undershoots. As a result, a moderate order L-C network is sufficient to approximate the desired target response so that maximum information density can be achieved. The tapped delay line provides an output signal that consists of a superposition (sum) of the input signal successively delayed and weighted. This forms a transversal filter. As with any linear filter, reciprocity applies. Consequently, the output of the tapped delay line is taken from the input with AC coupling directly to ground. The output is taken from a low characteristic impedance, eliminating the need for an internal amplifier capable of driving a low impedance equal to the characteristic impedance of the delay line.

DETAILED DESCRIPTION OF THE PRESENT INVENTION

A channel filter employing time domain targeting techniques to eliminate inter-symbol interference in the reading of information for magnetic media is described. In the following description, numerous specific details are set forth, such as tap weights, characteristic impedences, number of variables, etc. in order to provide a more thorough understanding of the present invention. However, it will be obvious, to one skilled in the art, that the present invention may be practiced without these specific details. In other instances, well known circuits have not been shown in detail in order not to unnecessarily obscure the present invention.

Figure 1:
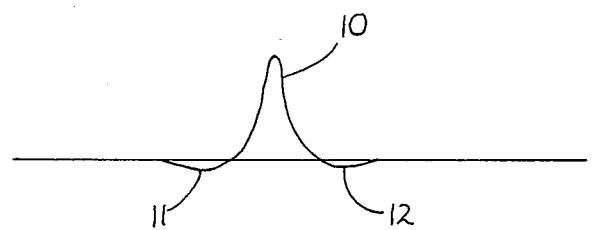
FIG. 1 is a timing diagram illustrating a typical read pulse having pre-cursive and post-cursive undershoots.
Figure 2:
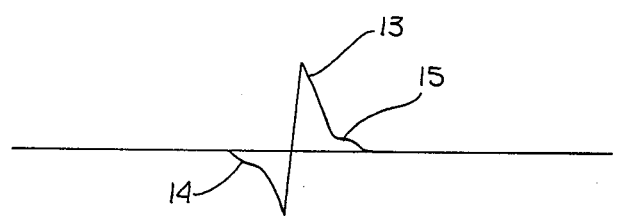
FIG. 2 is a derivative of the curve of FIG. 1 illustrating a plateau and widening effect of the pre-cursive and post-cursive undershoots.

The characteristic response of a typical read channel of a magnetic media storage disk is shown in FIGS. 1 and 2. FIG. 1 shows an isolated pulse response 10. The characteristic isolated pulse response of a typical prior art read channel includes a pre-cursive undershoot 11 extending below "0" line and a post-cursive undershoot 12 extending below zero as well. These undershoots are the result of thin film magnetic heads used for reading and writing from the magnetic disk. As previously discussed, by extreme widening of the pole faces, this undershoot effect can be eliminated. Widening pole faces causes them to appear to be semi-infinite at the point of the discontinuity (the gap between the poles). However, with present deposition technology, it is not economically feasible to manufacture wide pole face thin film heads on a large scale.

The differentiation of the pulse of FIG. 1 is shown in FIG. 2. The pre-cursive undershoot 11 results in a plateau 14 in the differentiated waveform 13. Likewise, the post-cursive undershoot causes a broad plateau 15 in the differentiated waveform. These plateaus widen the differentiated signal waveform, preventing the full potential window margin from being achieved. This widening results in inter-symbol interference when differentiated waveforms overlap as a result of pulse transitions being packed closely together. The differentiated waveform provides a zero crossing whose position provides information which is decoded as a "1" or a "0". The inter-symbol interference can shift the position of a zero crossing causing an error, and reducing the margin of the read system.

Figure 3:
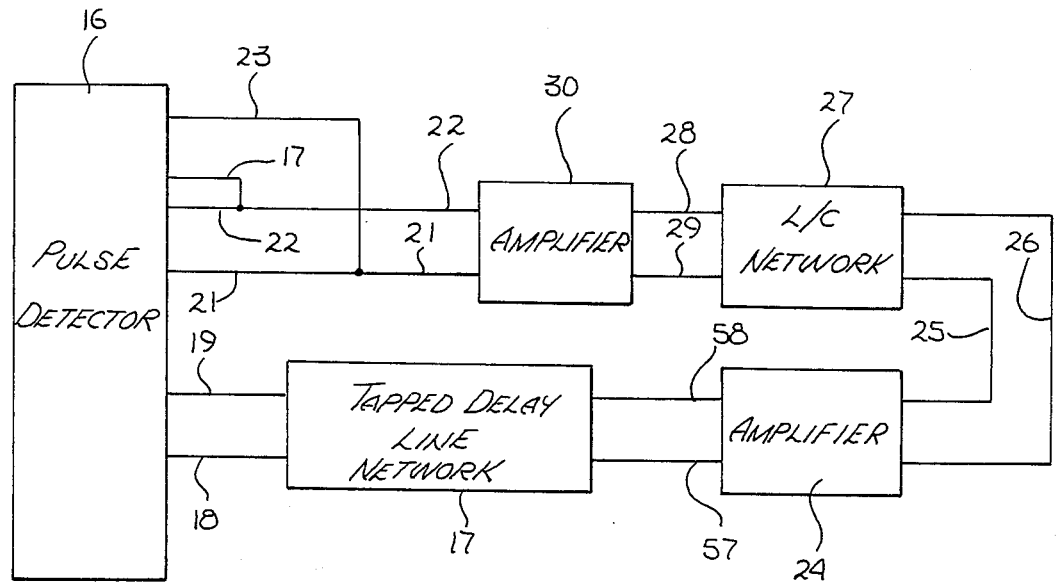
FIG. 3 is a block diagram of the preferred embodiment of the present invention.

A block diagram illustrating the preferred embodiment of the present invention is illustrated in FIG. 3. The present invention comprises a pulse detector 16 which is used to detect amplitude peaks of a signal received from a read/write amplifier fitted within a magnetic head of a disk drive system. These peaks correspond to flux reversals on the magnetic medium and result in a series of pulses of alternating polarity. The pulse detector estimates the time position of these peaks. In the preferred embodiment of the present invention, a pulse detector such as National Semiconductor part number DP8464B is utilized. It will be obvious, however, that any suitable pulse detector may be utilized without departing from the scope and spirit of the present invention.

Pulse detector 16 outputs an ammplified signal on lines 18 and 19 which is coupled to a tapped delay line network 17. In the preferred embodiment of the present invention, the tapped delay line 17 is manufactured by Rombus and is a 50 ohm characteristic impedance tapped delay line. It will be obvious that any suitable tapped delay means may be utilized without departing from the scope of the present invention.

In the preferred embodiment of the present invention, the tapped delay line outputs a signal on lines 57 and 58, coupled to the amplifier 24. In order to take advantage of reciprocity and to obviate the need for an internal amplifier capable of driving a low impedance, the output 58 is actually the input of the tapped delay line 17. Typically, a tapped delay line is driven from a signal source at the tapped delay line's characteristic impedence. Large resistors are then used to sum the outputs from each of the taps which is then amplified again to obtain an output signal. The present invention does the opposite, removing the requirement for an amplifier capable of driving a low impedance equal to the characteristic impedance of the tapped delay line. In effect, the tapped delay line of the present invention is driven from the summing points of the tap resistors and the output is taken from the input of the tapped delay line at its characteristic impedance. In this manner, the input of the tapped delay line is terminated and the opposite end of the tapped delay line is in effect open circuited. This allows the present invention to take full advantage of the linearity of the tapped delay line, simplifies the circuit yet retains all the flexibility of the delay line for use in shaping the ultimate output wave form.

The output of tapped delay line 17, outputs 57 and 58, are coupled to amplifier 24. In the preferred embodiment of the present invention, the shaped output of tapped delay line network 17 is first DC blocked prior to amplification. The output of amplifier 24 is coupled on lines 25 and 26 to an L-C network 27. As previously mentioned, the L-C network is of moderate order and includes cross coupled capacitors to provide delay equalization and a ladder network which provides amplitude attenuation and shaping over the desired frequency band to produce the desired output.

The output of L-C network 27 on lines 28 and 29 is coupled thorugh amplifier 30 to pulse detector 16 at inputs 21 and 22. The input to pulse detector 16 at inputs 21 and 22 is the undifferentiated waveform. The output of amplifier 30 is taken through lines 17 and 23 to pulse detector 16 to obtain the derivative waveform to determine zero crossing occurrences.

The pulse detector 16 of the present invention operates by amplifying the read channel signal and outputting it on lines 18 and 19. This signal is fed through the external filter consisting of the tapped delay line network, amplifiers, and L-C network to the differentiator of the pulse detector 16. The differentiator signal crosses zero at the peaks of the read channel signal. The purpose of the external filter is to bandwidth limit the incoming signal for noise and to shape the time domain output for containment to minimize inter symbol interference and maximize linear density capability.

In the preferred embodiment of the present invention, a linear tapped delay line in conjunction with a moderate order L-C network is utilized to provide bandwidth limiting of the read channel signal and shaping of the input wave to result in the targeted output wave form.

The tapped delay line in the preferred embodiment of the present invention is a one-half microsecond delay line utilizing ten taps. The pulse entering tap 10 travels the length of the delay line and is terminated in the characteristic impedance of the delay line without a significant reflection.

Moving to tap 9, the initial response is delayed by the distance between tap one and tap two, which in the preferred embodiment is on the order of 50 nanoseconds. However, the echo coming back arrives approximately 50 nanoseconds sooner. By adding and subtracting the responses at each tap the shape of the resulting output wave form can be manipulated. As mentioned previously, the signal on line 18 is the mirror image of the signal on line 19. That allows adding and subtracting of the response wave forms to customize the output wave form.

The output wave form of the tapped delay line network 17 on lines 57 and 58 does not yet match the targeted wave form. Therefore, the signal is passed through the amplifiers and LC network to provide the remaining amplitude attenuation and shaping to produce the desired output wave form at the inputs to the pulse detector 16.

Figure 4:
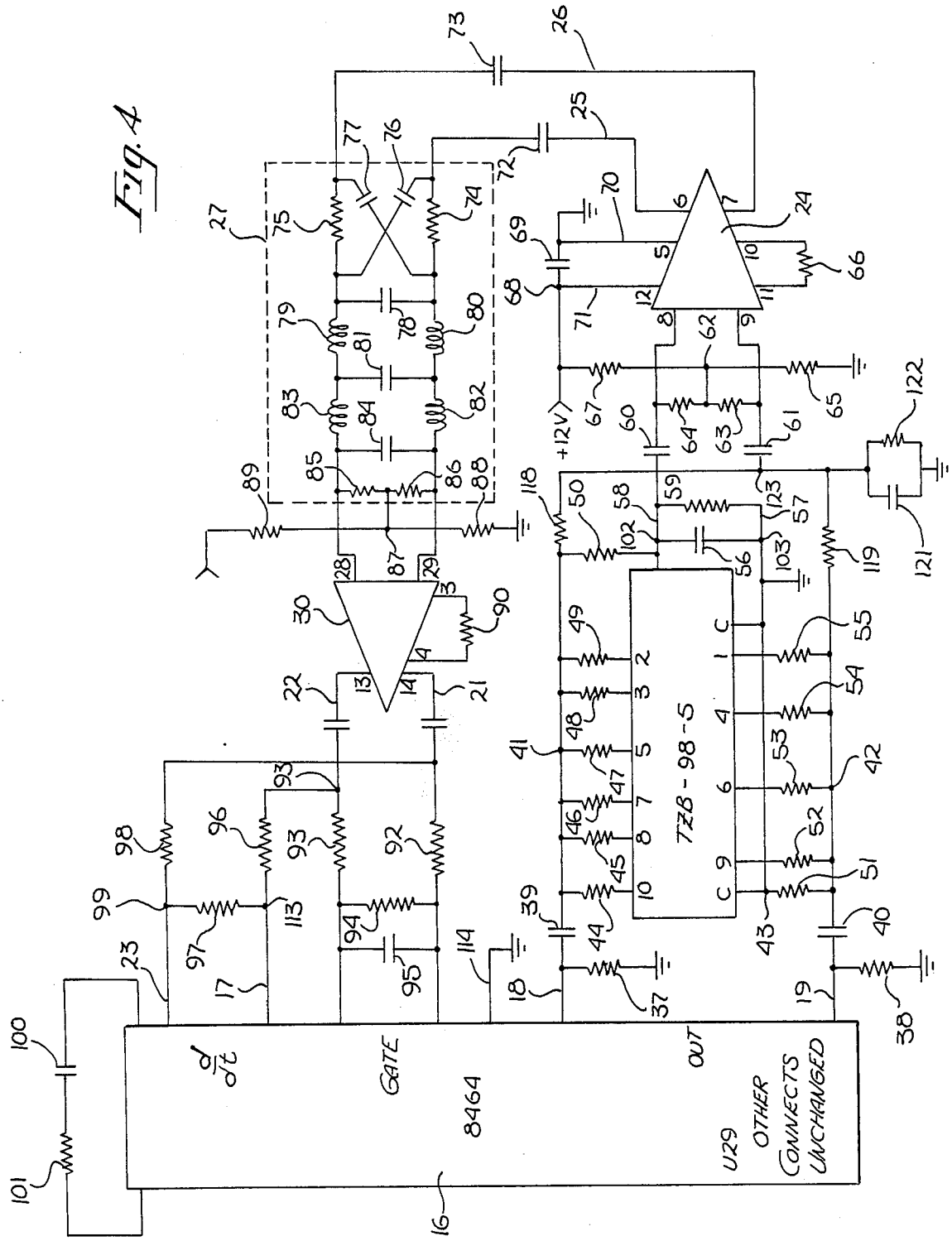
FIG. 4 is a circuit diagram illustrating the preferred embodiment of the present invention.

The circuit of FIG. 3 is shown in detail in FIG. 4. As previously described, pulse detector 16 receives input from the magnetic read heads. This signal is output on busses 18 and 19 to the tapped delay line 17. Busses 18 and 19 are the differential outputs of pulse detector 16 with the output on line 18 being the negative of the output on line 19. In this manner, the sign of the tap weights can be selected by connection to either the positive bus 19 or negative bus 18. Pull down resistors 37 and 38 are coupled to busses 19 and 18 respectively and to one terminal of capacitors 39 and 40 respectively. In this manner the signals may be DC blocked prior to entering the tapped delay line network. Bus 19 is coupled to node 41 and through tap resistors 44–49 to certain taps of delay line 17. Node 41 is also coupled through resistor 50 to the input of delay line 17.

Negative bus 19 is coupled through node 42 and tap weight resistors 51–55 respectively to remaining taps of delay line 17. Resistor 51 is coupled to the "C" pins of delay line 17 through node 43. The output of the delay line 17 is taken from line 57, coupled to node 43, and from line 58, coupled to the "in" pin of delay line 17. Nodes 41 and 42 represent the positive and negative drivers, respectively, of each side of delay line 17. In the configuration of the present invention here described, these nodes are being driven by the output of pulse detector 16 on busses 18 and 19. In the preferred embodiment of the present invention, the node points have an impedence approximately ten times that of the characteristic input impedance of delay line 17. The characteristic impedance of the tap delay line 17 is approximately 50 ohms while the miniumum impedence of the node point is approximately 500 ohms. Thus there is no need for an amplifier capable of driving the low characteristic impedance of the tap delay line 17.

Capacitor 56 and resistor 59 are coupled in parallel across output lines 57 and 58 at nodes 102 and 103 respectively. Node 102 is coupled through capacitor 60 to amplifier 24.

Node 41 is coupled through resistor 118 to node 123. Node 123 is coupled through capacitor 61 to amplifier 24. Capacitor 60 and 61 provide DC blocking of the output signal of tapped delay line 17. A pair of resistors 63 and 64 are coupled in series at node 62 and are coupled across the inputs of amplifier 24 at nodes 104 and 105. Node 42 is coupled through resistor 119 to node 123. Node 123 is coupled through capacitor 121 and resistor 122 in parallel to ground. This circuitry improves common mode rejection characteristics at the following amplifier. When the same voltage is coupled to both the positive and negative tap lines, there may be excessive cross-talk and other interference. By coupling nodes 41 and 42 through resistors 118 and 119 to node 123, and then through capacitor 121 and resistor 122 to ground, the cross-talk effect is attenuated.

The positive bias input of amplifier 24 at line 71 is coupled to one terminal of resistor 69 at node 68 and to a 12 volt supply voltage. Capacitor 69 is coupled at the other terminal to ground and to the negative bias input of amplifier 24 through line 70. A resistor 66 is coupled to the gain set terminals of amplifier 24. The supply voltage is coupled through resistor 67 to node 62, and node 62 is coupled through resistor 65 to ground.

The output of amplifier 24 on lines 25 and 26 and is DC blocked by capacitor 72 and 73 respectively. The signal is then coupled to an L-C filter circuit for final shaping, resulting in the desired output wave shape.

The L-C network provides delay equalization through cross coupled capacitors 76 and 77 which are coupled across resistors 74 and 75. Resistor 74 is coupled to input line 25 and resistor 75 is coupled to line 26.

The remainder of the L-C circuit comprises inductors 79 and 83 coupled in series to the output of resistor 85, inductors 80 and 82 coupled in series to the output of resistor 86 and capacitors 78, 81 and 84 coupled in ladder fashion across the input lines 25 and 26.

The output of the L-C circuit is taken at node 106 and 107 and inputted to amplifier 30. Load resistors 85 and 86 coupled in series at node 87 are coupled to nodes 106 and 107 respectively. A 12 volt supply voltage is coupled through resistor 89 to node 87 which is also coupled through resistor 88 to ground. The gain set terminals of amplifier 30 are coupled across resistor 90.

The output of amplifier 30 on lines 21 and 22 is DC blocked by capacitors 108 and 109 respectively. The output of capacitor 108 is taken at node 91 and the output of capacitor 109 is taken at node 112. Node 91 is coupled through resistor 93 to node 110, node 112 is coupled through resistor 92 to node 111. Capacitor 95 and resistor 94 are coupled in parallel to nodes 110 and 111. The signals at nodes 110 and 111 represent the undifferentiated signal pulse of the read channel and are inputted to pulse detector 16 at pins 21 and 22, the differential inputs to the gating channel of pulse detector 16.

The signal at node 91 is coupled through resistor 96 to node 113 and the signal at node 112 is coupled through a resistor 98 to node 99. Node 99 is coupled to node 113 through resistor 97. Nodes 99 and 113 are coupled to pulse detector 16 at pins 23 and 2 respectively. These pins are the differential inputs to the differentiator in the time channel of pulse detector 16. This derivative wave form can be measured across the external differentiator network consisting of resistor 101 coupled in series with capacitor 100 to nodes 116 (pin 1) and 115 (pin 24) of pulse detector 16. In this manner the time of occurrence of the zero crossing may be detected. All signals are referenced to analog ground 114.

In operation, the read channel output signal from a magnetic media disk received by pulse detector 16 and the differentiated output of the pulse is outputted on busses 18 and 19. As previously discussed, busses 18 and 19 are coupled to tapped delay line 17 through a plurality of resistors defining the relative weights of the taps of the tapped delay line. Each of the tap responses are superimposed at summing points 41 and 42 and taken as a differential output on lines 58 and 57 respectively.

The differentiated output signal from tapped delay line 17 is DC blocked by capacitors 60 and 61 respectively prior to being amplified by amplifier 24. The amplified differentiated output of amplifier 24 on lines 25 and 26 is again DC blocked by capacitor 72 and 73 respectively prior to undergoing delay equalization in the lattice filter consisting of cross coupled capacitors 77 and 76.

The output of the lattice filter is coupled to the previously described ladder LC network which provides amplitude equalization of the signal. The output of the ladder LC network is amplified by amplifier 30 and the differential output on lines 21 and 22 is split, being inputted to both the gate signal input of pulse detector 16 and the differentiator input of pulse detector 16. A derivative wave form is produced which is measured across resistor 101 of pulse detector 16 and the zero crossing of that wave form can be detected to indicate the time of occurrence of the actual data base of the flux transitions. The result is a read channel output wave form having substantially no pre-cursive and post-cursive undershoot and correspondingly no plateau effect in the derivative wave form.

The present invention has equal application to a variety of input wave forms and targeted output wave forms. By way of example, the following relative tap weights were found to be advantageous in operation on the wave form illustrated in FIG. 1 of the present application. For purposes of this example, the tap weight of tap 44 will be assumed to be 1.

| TAP NO. | RELATIVE WEIGHT |
|---------|-----------------|
| 44 | 1 |
| 45 | .051 |
| 46 | .364 |
| 47 | .302 |
| 48 | .043 |
| 49 | .010 |
| 50 | .023 |
| 51 | .200 |
| 52 | .954 |
| 53 | .475 |
| 54 | .095 |
| 55 | .024 |

As previously discussed, the present invention employs a targeting concept achieving the desired output wave form. In other words, the input signal is known, the desired output wave form is determined (targeted), and variables in the filter circuit are then manipulated to achieve the desired output. In the preferred embodiment of the present invention, an iterative approach is utilized in which initial values are assigned to the filter variables (tap weights, etc.) and an initial output is generated. The variables are then manipulated and intermediate output wave forms are generated. The interation continues until an output wave form approximating the targeted wave form is achieved. It will be obvious that the present circuit is susceptible to a plurality of iterative methods for achieving a desired wave form solution. Further, the circuit of the present invention is equally applicable to a plurality of targeted wave forms.

Further, any suitable L-C network of moderate order which will achieve the desired attenuation of the output signal from the tapped delay line may be utilized. The present invention eliminates the requirement of high order L-C networks to time domain target the desired waveform. By utilizing a tapped delay line with a moderate order L-C network, the number of variables which must be tracked in the interactive solution process is reduced, streamlining that process.

Thus, a novel channel filter for implementing time domain targeting of an output wave form has been described.

What is claimed is:

1. A circuit for detecting amplitude peaks of an input signal and for shaping said signal to a desired output signal, said circuit comprising:
    pulse detection means coupled to said input signal for detecting said amplitude peaks and for outputting a first differentiated output signal;
    tapped delay means coupled to said first output signal, said tapped delay means providing a second differentiated output signal, said second output signal taken from an input of said tapped delay means at the characteristic impedence of said tapped delay means;
    delay equalization means coupled to said second output signal;
    amplitude attenuation means coupled to said delay equalization means, said amplitude attenuation means outputting a third differentiated output signal;
    said third output signal coupled to differentiator means, said differentiator means outputting the derivative of said third output signal;
    detecting means for detecting zero crossing points of said derivative.

2. The circuit of claim 1 wherein said delay equalization means comprises first and second capacitors cross-coupled to said second output signal.

3. The circuit of claim 1 wherein said amplitude attenuation means comprises a ladder filter comprising inductors and capacitors.

4. The circuit of claim 1 further including amplifying means for amplifying said second output signal.

5. The circuit of claim 1 further including amplifying means for amplifying said third output signal.

6. The circuit of claim 1 wherein said first output signal is coupled to said tapped delay means through a pair of buses, said tapped delay means having a plurality of taps, each of said taps coupled to said buses through a resistor.

7. The circuit of claim 6 wherein the relative values of said resistors are determined by performing an iterative computation until said third output signal approximates said desired output signal.

* * * * *